Aug. 4, 1931.    C. F. FOTH    1,816,964
PHOTOGRAPHIC SHUTTER
Filed Oct. 10, 1928
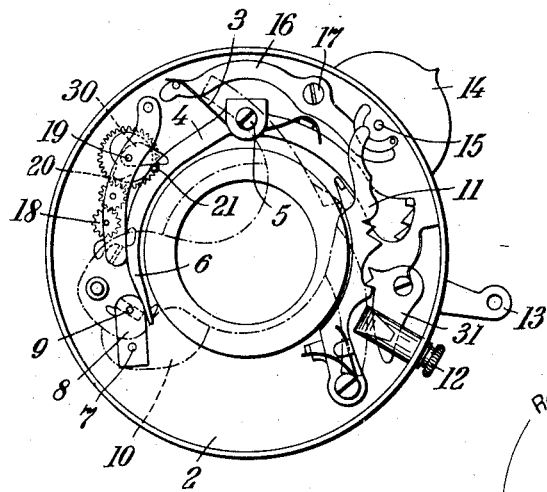
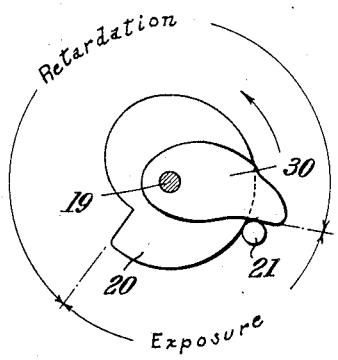
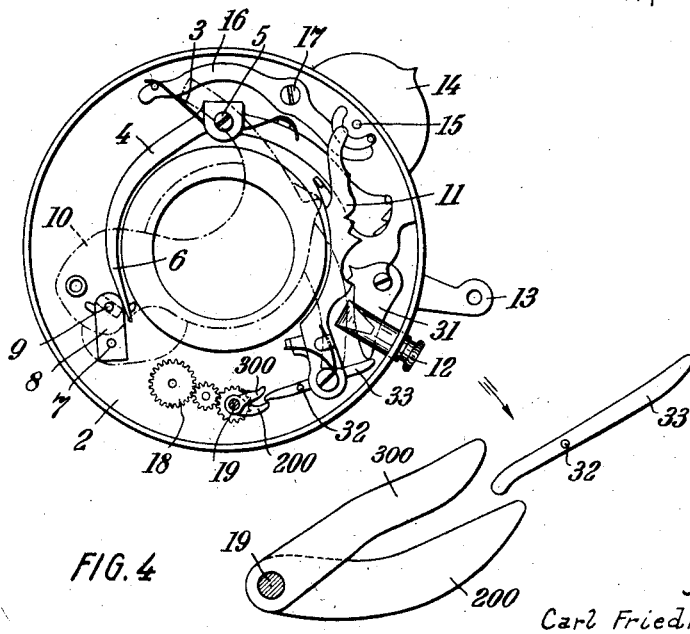
Inventor:
Carl Friedrich Foth
By Emil Bönnelyche
Attorney Patented Aug. 4, 1931

1,816,964

UNITED STATES PATENT OFFICE

CARL FRIEDRICH FOTH, OF BERLIN, GERMANY

PHOTOGRAPHIC SHUTTER

Application filed October 10, 1928, Serial No. 311,674, and in Germany February 9, 1928.

My invention relates to photographic shutters and more particularly to an improved shutter of the variable spring pressure type, in which the opening and closing of the circular shutting diaphragm composed of falciform blades or lamellæ adapted to move in radial direction, is accomplished by means of a lever system adapted to be operated by a finger-piece or a releasing wire. Shutters of this kind are utilizable for both snapshots or momentary exposures with adjustable duration of exposure and extended or time-exposures.

The object of my invention is to provide improved means for actuating, that is opening and closing the diaphragm by means of a moving mechanism adapted to run idle upon starting for a certain predetermined and adjustable length of time prior to the actual opening of the diaphragm so that the person in attendance of the photographic apparatus will have sufficient time to take a position in front of the apparatus ere the said actuating mechanism automatically opens the shutter.

With this object in view I provide a small clockwork of usual construction within the shutter casing and also means within the latter in operative connection with the said clockwork which when wound up and started, will first run idle for the predetermined and adjusted period and subsequently act to open and close the diaphragm.

Another object of my invention is to provide specific means for determining and adjusting both the length of the preliminary or idle running period and the duration or length of exposure which may come up to several seconds. With this object aimed at I provide on a shaft or arbor adapted to be revolved by the said clockwork, two cams or equivalent formations arranged so as to be adjustable with relation to each other, and adapted to actuate the lever system of the shutter for the purpose set forth.

With the above recited and other objects in view, reference is had to the following specification and annexed drawings in which there are exhibited two examples or embodiments of the invention which are in no way intended as a limitation upon the scope of the appended claims as it is to be clearly understood that variations and modifications which fairly fall within the true scope of said claims may be resorted to when found expedient.

In the accompanying drawings forming a part of this specification and showing for purposes of exemplification a preferred manner in which the invention may be embodied and practised, but without limiting the claimed invention to such illustrative instance or instances:

Figure 1 is a rear view of the opened shutter casing; Figure 2 is a similar view of the two cams on their shaft shown on an enlarged scale; Figure 3 is a view similar to Figure 1 and illustrating a modification of the construction and arrangement of the cams and coordinate parts; and Figure 4 is a view similar to Figure 2 and showing the modified cams of Figure 3 on an enlarged scale.

Referring on Figures 1 and 2 a two-armed lever 4 is pivotally supported or fulcrumed at 5 and a spring 3 is provided for keeping the lever under pressure. The extremity 6 of the one arm of the lever 4 engages a lever 7 pivotally supported at 8 and provided with a pin 9 adapted to engage and control the diaphragm ring (not shown) which is of usual construction and arranged as usually with the falciform lamellæ or blades in front of the lens tube 100, pivotally attached thereto. The lamellæ or blades 10 are shown in dotted lines.

The means for moving or operating the lever 4 comprises, as usually in a shutter of the variable spring pressure type, a lever mechanism 11 adapted to engage and actuate the other arm 1 of the lever 4 and to be in turn controlled by a fingerpiece 13 or by the usual releasing wire to be inserted into a tubular receiver 12 provided for the purpose. The shutter is adapted to be adjusted for actuation in connection with snapshot, ball- or time-exposure just in accordance with the adjustment of the disc 14 provided on the front side of the casing 2 and pivotally mounted on a stationary pin 15. The duration of the exposure is controlled by a two-armed lever 16 fulcrumed at 17 and adapted to be turned about its pivot 17, by the agency of a pin provided on the disk 14, more or less in conformity with the desired or adjusted duration of the exposure, whereby the spring 3 will be stressed more or less accordingly.

The hereinbefore described construction of the shutter is universally known and therefore the description and showing thereof are restricted to those parts which are necessary for the understanding of the present invention, but which are not claimed to be novel.

In the following I shall now proceed to describe more in detail the improvements according to the present invention. For the purpose of preventing the shutter to be operated or opened except after a predetermined length of time upon or subsequently to release, a clockwork 18 is mounted, according to the present invention, within the casing 2 intermediate between the pivot 5 and the extremity 6 of the lever 4. The clockwork 18 may be of any appropriate construction and is in itself known.

Firmly attached the shaft 19 of the clockwork is a cam 20 adapted to co-operate with a pin 21 of the lever 4 in a manner that, upon release, the lever 4 will first be displaced gradually more and more by the cam 20 revolving in counter-clockwise direction and against the action of the spring 3 and thereupon be released so as to abruptly return to its previous position and cause the shutter controlling lever 8 to open the blades of the diaphragm and close the same after the lapse of a predetermined length of time, say one twenty fifth or one fiftieth of a second. The cam 20 is shaped to form a peripheral spiral edge or face extending over about 360° with its ends connected by a radial edge or face forming a step for the abrupt release of the lever 4 as above described.

The running time of the clockwork is determined or adjusted so as to afford the operator sufficient time, upon actuation of the clockwork, to step to the front of the apparatus ere the shutter will be opened. Generally about eight seconds are deemed to be sufficient for the purpose, that is to say, it will take eight seconds for the controlling cam 20 to perform one full revolution. For the purpose of winding up the clockwork a key (not shown) or the like is to be provided and arranged in the casing preferably in the same manner as usually employed in connection with spring-controlled automatic toys for children or musical apparatus, so that detail description and showing thereof is deemed unnecessary, and for the purpose of actuating or starting the clockwork a push-button or the like of usual construction and arrangement may be provided which requires no further description or showing for the same reason.

In the embodiment so far described with reference to Figures 1 and 2 the automatic actuator constructed in accordance with the present invention is suited for snapshot exposures. In order to adapt the same also for time exposures, that is to say, for taking photographs requiring a longer exposure than snapshots, a second cam may be provided on the shaft 19. As shown in Figure 2 there is fixed on the shaft 19 an adjustable cam 30 of approximately the same radial maximum dimension as the cam 20. Upon actuation of the clockwork the shaft 19 with the two cams commences to revolve in the direction of the arrow shown in Figure 2 so that the cam 30 will first engage the pin 21 and cause the actuating lever 4 to be displaced until or whereupon during the continued movement of the cam 30 the pin 21 will drop from the latter and re-engage the cam 20 to occupy a position behind the cam 30 as shown in Figures 1 and 2, with the result that the lamellæ or blades of the diaphragm will be opened and remain in opened position until the pin 21 drops from the extreme point of the cam 20.

It will be seen that the period or length of time elapsing between the successive actions of the two cams on the pin 21 and the blades of the diaphragm, can be varied by displacing and adjusting the two cams on the shaft 19 with relation to each other. Supposing, for instance, the shaft 19 revolves at a speed of one full rotation in eight seconds and the angular displacement or difference between the top points of the two cams is 90°, the exposure will last two seconds while the length of time elapsing from the moment of actuating or starting the clockwork down to the moment at which the shutter opens, will amount to six seconds. If, however, the cam 30 is so adjusted that the angular displacement between the two cams includes or amounts to an angle of 180° the retardation will amount to four seconds and the period of exposure will also amount to four seconds. For momentary exposures or snapshots the cam 30 must be so set that the top points of the two cams coincide in one and the same radial line. In such a case the cam 20 only will engage the pin 21, as hereinbefore described and the duration of the exposure will depend in this case only upon the tension given to the adjustable spring 3.

If desired the revolving speed of the shaft 19 may be controlled or adjusted by a suitable braking device or by changing the gearing ratio in the clockwork. For the purpose of varying and adjusting the position of the cam 30 relative to the cam 20 a key or pointer may be provided outside of the casing 2 together with means inclusive of a dial for indicating the angular adjustment of the two cams or showing in terms of seconds, the duration of the exposure. The said key may at the same time be utilized for rigidly interconnecting the two cams after adjustment.

In the modification shown in Figures 3 and 4 the clockwork is located between the lever 8 controlling the lamellæ or blades and the tubular wire receiver 12 and adapted to operate the actuating lever 31 which when the disk 14 is set to "Time", must perform two strokes for the purpose of first opening the lamellæ or blades and subsequently closing the same again. According to the present invention the said lever 31 is controlled by a two-armed lever 33 journaled at 32 and in turn engaged and displaced by the cams 200 and 300 fixed to the shaft 19 of the clockwork 18. As the shaft 19 rotates in the direction of the arrow shown in Figure 4, first the cam 200 will engage the lever 33 pivotally mounted at 32, and displace the same so that also the lever 31 will be correspondingly displaced by the lever 33 and the lamellæ or blades of the diaphragm be opened. As the shaft 19 continues to rotate the lever 33 will be engaged and moved a second time by the cam 300 with the result that the blades of the diaphragm will be closed again. Also in the embodiment the period or duration of exposure and that of retardation depend upon the adjustment of the angular relationship of the two cams 200 and 300. As regards manipulation a difference between the embodiment shown in Figures 1 and 2 and the modification illustrated in Figures 3 and 4 resides only in that the disk 14 of the latter must be set to "Time" whereas in the former such setting is not necessary.

An automatic actuator constructed and arranged as herein set forth and shown also affords the advantage of being applicable in connection with photographic shutters or cameras of existing types without requiring any constructional changes in the shutter mechanism, properly speaking, and without impairing in any way the operation of the shutter through the inserted clockwork, so that it is possible to make exposures optionally with or without retardation.

Though I have described with great particularity of detail two practical constructions of my present improvements, yet it will be apparent that the device is susceptible of embodiment in various alternative forms and I, therefore, reserve as above intimated the privilege of resorting to all such legitimate changes as may be fairly embodied within the spirit and scope of the invention as claimed.

What I claim is:—

1. In a photographic shutter including a casing provided with a central exposure aperture, a diaphragm structure adapted to close and open the said aperture for the exposing purpose, a clockwork mounted in the said casing and adapted to be started from without, a shaft adapted to be revolved by the said clockwork, two cams on the said shaft, a lever adapted to actuate the said diaphragm, and a pin fixed on said lever and adapted to be engaged by the said cams and in turn to displace the lever for the actuation purpose.

2. In a photographic shutter including a casing provided with a central aperture, a diaphragm structure adapted to close and open the said aperture for the exposing purpose, a clockwork mounted in the said casing and adapted to be started from without, a shaft adapted to be rotated by the said clockwork, two cams on the said shaft, the one fixed thereto and the other one adjustably mounted thereon, a lever adapted to actuate the said diaphragm, and a pin fixed on said lever and adapted to be engaged by the said cams and in turn displace the lever for the actuation purpose.

In testimony whereof I affix my signature.

CARL FRIEDRICH FOTH.